United States Patent
Beltowski et al.

[11] Patent Number: 6,092,277
[45] Date of Patent: Jul. 25, 2000

[54] ROTOR BAR SWAGING PROCESS

[75] Inventors: Mark Frederick Beltowski; Peter Gerard Kloecker, both of Erie, Pa.

[73] Assignee: General Electric Company, Erie, Pa.

[21] Appl. No.: 09/300,904

[22] Filed: Apr. 28, 1999

[51] Int. Cl.⁷ .................................................. H02K 15/02
[52] U.S. Cl. ............................................. 29/598; 310/211
[58] Field of Search ............................. 29/598; 164/109; 310/211, 212

[56] References Cited

U.S. PATENT DOCUMENTS

| 3,683,493 | 8/1972 | Begovich | 29/598 |
|---|---|---|---|
| 5,937,508 | 8/1999 | Shiga | 29/598 |

*Primary Examiner*—Carl E. Hall
*Attorney, Agent, or Firm*—Ann M. Agosti; Carl A. Rowold

[57] ABSTRACT

A method for reducing the movement of a rotor cage relative to a rotor core in a rotor assembly, such as found in a squirrel cage AC induction motor. Movement is reduced by forming a depression in a portion of a rotor bar of the rotor cage. Formation of the depression displaces rotor bar material adjacent to the depression. The displacement of rotor bar material deforms an adjacent portion of the rotor core thereby fixing the rotor cage to the rotor core. The reduction in movement between the rotor cage and the rotor core is dependent on various depression geometries, quantities and positions. The invention further includes a rotor assembly with a substantially cylindrical rotor core having longitudinally extending slots on its outer surface. A rotor bar is positioned in at least one of the slots. The rotor assembly has at least one depression formed in a rotor bar which displaces rotor bar material into the rotor core, whereby the rotor bar is substantially fixed into a desired position with respect to the rotor core.

17 Claims, 3 Drawing Sheets

ROTOR BAR SWAGING PROCESS

BACKGROUND OF INVENTION

This invention relates to squirrel cage alternating current (AC) induction motors. More particularly, this invention relates to a process for securing a rotor cage to a rotor core in a rotor assembly, such as is found in a squirrel cage AC induction motor, and a rotor assembly formed therefrom.

The rotor assembly, such as is found in a squirrel cage AC induction motor, comprises a rotor cage, rotor core, and shaft. Typically, the rotor core comprises a series of disk shaped laminates stacked to form a hollow cylinder. The rotor core is most commonly steel but may be constructed of other materials. The core contains substantially longitudinal slots which may be surrounded completely by core material or may be open to the outer longitudinal surface of the core.

The rotor cage is also cylindrical in shape and is comprised of a plurality of rotor bars, mechanically and electrically secured by end rings. Rotor bars may be made of various material but most commonly are copper alloy or aluminum. The rotor bars are generally of comparable geometry to the slots. Numerous slot and rotor geometries have been successfully used in motor designs.

In a typical rotor assembly, the rotor cage is constructed by inserting the rotor bars in the rotor core slots, then securing the end rings to the bars by any method known in the art, for example brazing. Although components of the rotor cage are positioned within the rotor core, the cage is not typically fixed or secured to the core. This rotor assembly design results in some potential movement of the rotor cage with respect to the rotor core which is undesirable.

The comparable size of the slots and the rotor bars vary with temperature changes due to the differences in the expansion coefficients of the rotor bar and rotor core materials. Fluctuations in coefficients of the rotor bar and rotor core materials. Fluctuations in comparable sizes cause variations in the degree of movement between the rotor cage and the rotor core. Temperature variations may be caused by changes in current and speed during motor operation and by external temperature changes. These variations make it difficult to continuously maintain a close fit between the rotor cage and the rotor core. Absent a close fit, the rotor cage will move relative to the rotor core creating an imbalance. Resulting tilting of the rotor cage with respect to the rotor core may introduce unwanted axial forces on the rotor cage.

A cage positioned within the core at room temperature may shift when heated and settle in a different position when brought back to room temperature. Therefore, the relative position of the rotor cage and the rotor core at a particular temperature may vary, thereby affecting motor performance in an unpredictable manner.

Motor performance is also sensitive to rotor deviation from the central position of a surrounding stator. Movement of the rotor cage within the rotor core may contribute to unwanted rotor displacement within the stator, thereby reducing efficiency of the motor.

For the foregoing reasons there is a need for a method to reduce the movement between the rotor cage and the rotor core.

SUMMARY OF THE PRESENT INVENTION

The invention is directed to a method for reducing or eliminating the movement of a rotor cage relative to a rotor core in a rotor assembly, such as is found in a squirrel cage AC induction motor, and, furthermore to a rotor assembly formed therefrom.

The method first includes positioning the rotor cage on the rotor core. A swage tool is then placed against an exposed longitudinal surface of a rotor bar. The swage tool is forced against the rotor bar to form a depression in the bar. Formation of the depression causes rotor bar material to be displaced, thereby deforming a portion of the rotor bar adjacent to the depression. This deforming action also causes a portion of the rotor core adjacent to the depressed area of the rotor bar to be deformed. The deformation of the rotor core and the rotor bar substantially fixes the rotor bar into a desired position with respect to the rotor core.

The rotor assembly comprises a hollow rotor core of substantially cylindrical shape having an outer surface and a plurality of substantially longitudinally extending slots formed in the outer surface. The rotor assembly further includes a rotor bar positioned within at least some of the slots having a longitudinal surface exposed at the outer surface of the core. The rotor assembly has at least one depression formed in a rotor bar which displaces the rotor bar material into a portion of the rotor core adjacent to the depression. The resulting displacement of material substantially fixes the rotor bar into a desired position with respect to the rotor core.

These and other features of the present invention will become better understood with reference to the following description.

DETAILED DESCRIPTION OF THE INVENTION

This invention relates to rotor assemblies, such as those found in squirrel cage AC induction motors.

The method of the invention generally comprises positioning a rotor cage within a rotor core in a rotor assembly and creating a depression in a bar of the rotor cage. Creation of the depression causes displacement of rotor bar material thereby deforming a portion of the rotor bar adjacent to the depression. The deforming action also causes a portion of the rotor core adjacent to the depression to be deformed. The deformation of the rotor core and the rotor bar substantially fixes the rotor bar into a desired position with respect to the rotor core. The invention further includes the rotor assembly formed by the method described herein.

Figure 1:
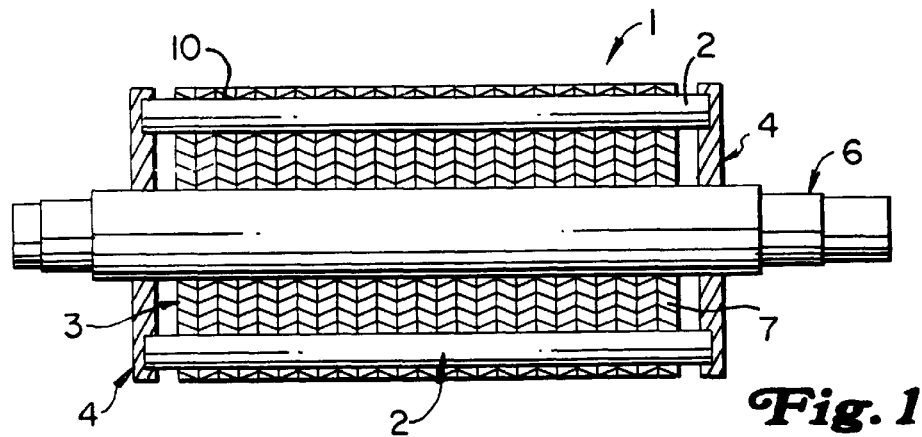
FIG. 1 is a schematic diagram of a squirrel cage AC induction motor rotor assembly.

Referring now to the drawings in general and FIG. 1 in particular, a rotor assembly 1 is shown. Rotor assembly 1 includes, rotor bars 2, a rotor core 3, end rings 4 and a shaft 6. Rotor bars 2, when fixed to end rings 4, as shown in FIG. 1, form a rotor cage.

Figure 2:
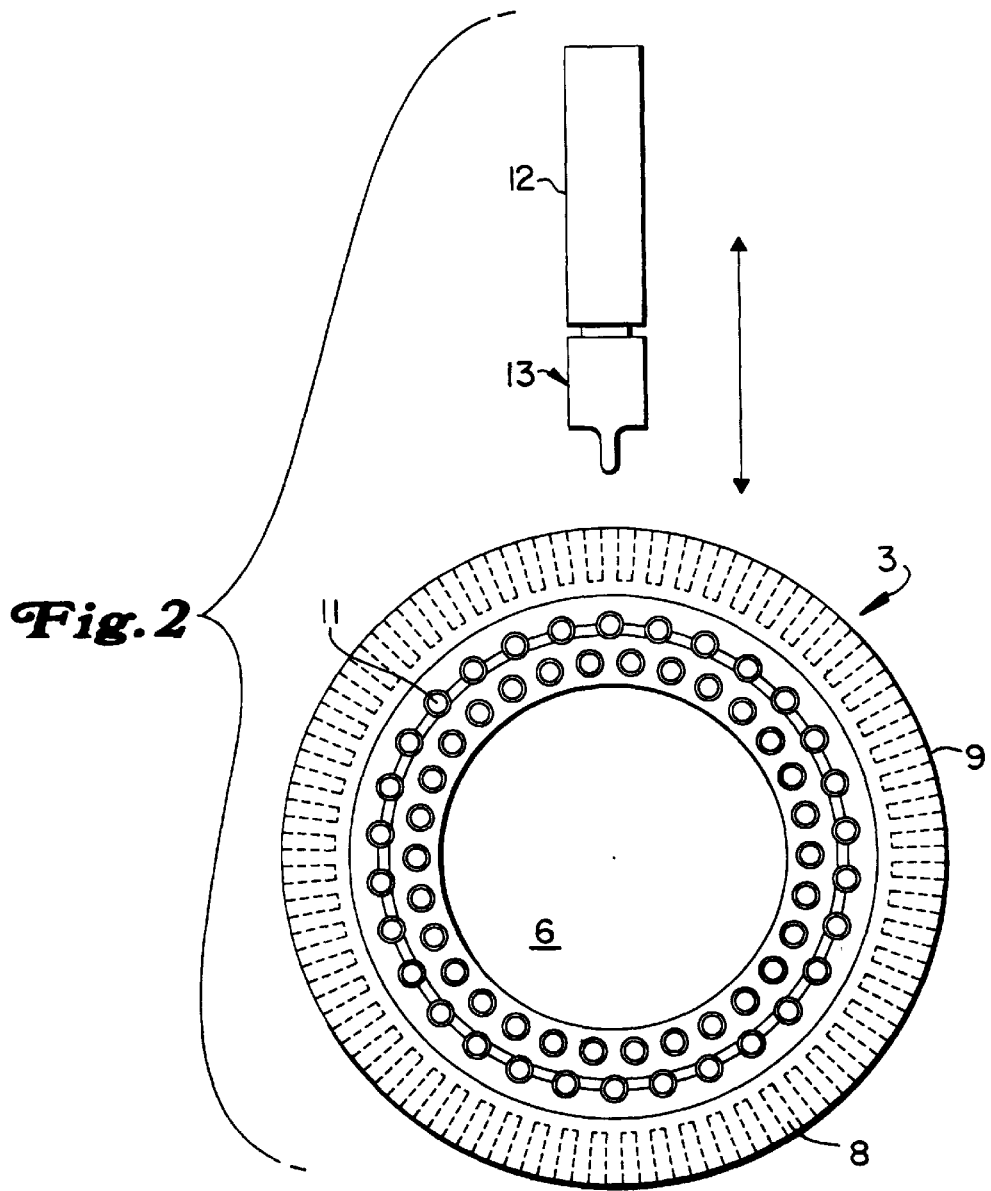
FIG. 2 is a cross-sectional view of a rotor core.

FIG. 2 depicts a cross-sectional view of a rotor core 3. Rotor core 3 is typically comprised of laminated disks 7, as shown in FIG. 1, forming a hollow cylinder through which shaft 6 is positioned. Rotor core 3 has a plurality of substantially longitudinally extending slots 8 formed in its outer surface 9. A rotor bar 2 is positioned within each slot 8 such that each rotor bar 2 has an exposed longitudinal surface 10 along outer surface 9 of rotor core 3. Rotor core 3 also contains a plurality of air holes 11 for cooling purposes.

The rotor cage is constructed by inserting rotor bars 2 in slots 8, then fixing or securing end rings 4 to rotor bars 2 by any method known in the art such as brazing. Although components of the rotor cage are within rotor core 3, the cage is not fixed to core 3. This typical rotor assembly design results in some potential movement of the rotor cage with respect to rotor core 3.

Figure 3:
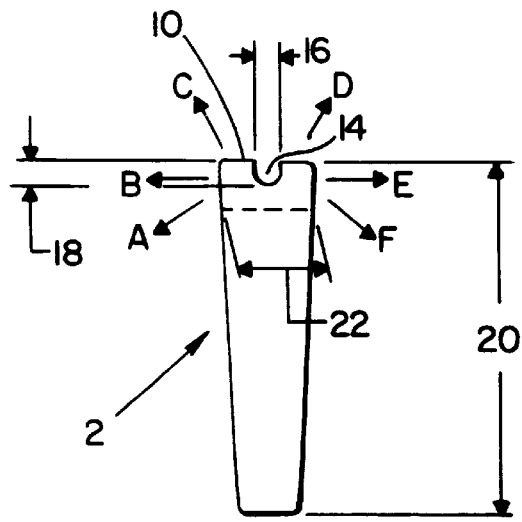
FIG. 3 is a cross-sectional view of a rotor bar having a depression.

To overcome this problem, specific steps are taken to substantially fix the rotor cage to rotor core 3. This is accomplished with a press 12, as shown in FIG. 2, having a swage tool 13. Swage tool 13 is applied against a portion of the exposed longitudinal surface 10 of rotor bar 2, thereby forming a depression 14 in rotor bar 2. FIG. 3 depicts a cross-sectional view of rotor bar 2 having a depression 14. Rotor bar material is displaced when depression 14 is formed, thereby deforming rotor bar 2 adjacent to the depression. The general direction of rotor bar material displacement is shown in FIG. 3 by arrows A–F. Rotor bar material displacement causes a portion of rotor core 3 adjacent to depression 14 to be deformed. Deformation of rotor bar 2 and adjacent rotor core 3 fixes the two components to one another, reducing movement between them.

Figure 4:
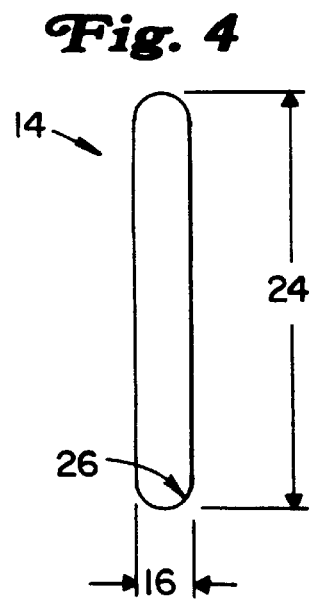
FIG. 4 is a diagram of a depression as shown in FIG. 3.

The geometry of a preferred embodiment of a depression pattern is depicted in FIG. 4. The optimum geometry of the depression depends on the geometry of rotor bar 2, and on rotor bar 2 and rotor core 3 materials. The optimum geometry minimizes stress riser effects and maximizes holding capability between rotor bar 2 and rotor core 3.

FIG. 3 depicts a depression 14 on the face of rotor bar 2 having an exposed longitudinal surface 10. The dimensions shown in FIG. 3 include, a depression width 16, a depression depth 18, a rotor bar depth 20 and a rotor bar width 22. FIG. 4 shows additional depression dimensions including a depression length 24 and a depression radius of curvature 26.

Obtaining a desired balance between stress riser effects and holding capability is very challenging and requires consideration of numerous parameters, such as rotor bar 2 and rotor core 3 geometry and material and other motor design and performance specifications. If depth 18 of depression 14 is too large compared to rotor bar 2 depth 20, the structural integrity of rotor bar 2 may be compromised. If depth 18 of depression 14 is too small as compared to depth 20 of rotor bar 2 the holding capability between rotor bar 2 and rotor core 3 may not be sufficient to maintain rotor bar 2 fixed in a desired position with respect to rotor core 3.

Likewise, too large a depression length 24 as compared to rotor bar 2 length or too large a depression width 16 as compared to rotor bar width 22 will adversely affect the structural integrity of rotor bar 2. Additionally, if depression length 24 or depression width 16 are too small compared to rotor bar 2 length and width, rotor bar 2 may not remain substantially fixed in a desired position with respect to rotor core 3.

Depth 18 of depression 14 is preferably in the range of about 5% to 15% of the rotor bar depth and more preferably in the range of about 6% to 8%.

Length 24 of depression 14 is preferably in the range of about 2% to 8% of the rotor bar length and more preferably in the range of about 3% to 5%.

Width 16 of depression 14 is preferably in the range of about 20% to 40% of the rotor bar width and more preferably in the range of about 30% to 35%.

The radius of curvature of depression 14 is also an important geometrical quantity. The radius of curvature of depression 14 is preferably in the range of about 0.127 cm to 0.191 cm. Within this range depression 14 will have a minimum of sharp notches.

The optimum geometry of depression 14 and the resulting holding capability depends in part on the rotor cage and rotor core materials. In one embodiment, rotor core 3 is comprised of steel. Another embodiment includes a copper alloy rotor bar.

Although a single depression in a single bar will reduce movement with respect to the rotor cage by a remarkable and unexpected amount, additional depressions are preferred. In one embodiment, depressions are created in a plurality of rotor bars 2, producing further reduction in the movement between the rotor cage and the rotor core.

Forming a plurality of depressions in rotor bar 2 is another method of stabilizing the rotor cage with respect to the rotor core.

In one embodiment, depressions are formed in sets of consecutive rotor bars.

Figure 5:
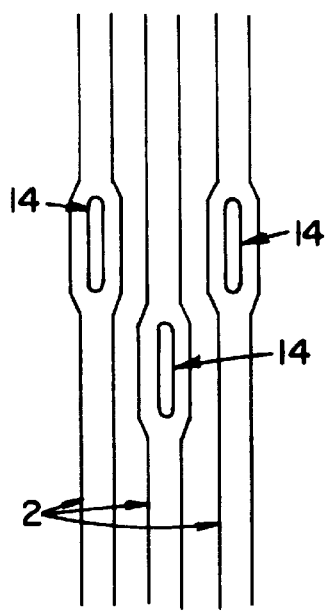
FIG. 5 is a diagram of a depression pattern including three consecutive rotor bars.

FIG. 5 depicts an embodiment wherein depressions 14 are formed in consecutive rotor bars 2 in a staggered pattern, creating an interlocking effect. FIG. 5 shows the interlocking effect in three consecutive rotor bars 2, however, the interlocking effect may be created in any number of consecutive rotor bars.

Figure 6:
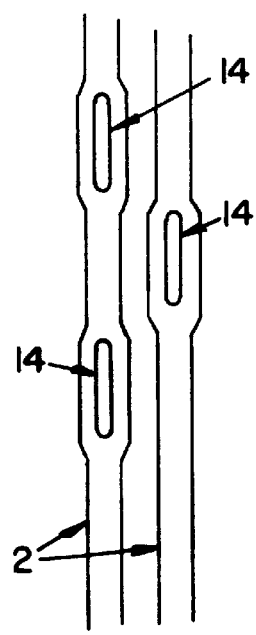
FIG. 6 is a diagram of a depression pattern including two consecutive rotor bars.

An interlocking effect may also be created between two rotor bars 2 by forming two or more depressions 14 in a single rotor bar 2 adjacent to a rotor bar with one or more depressions as depicted in FIG. 6.

Figure 7:
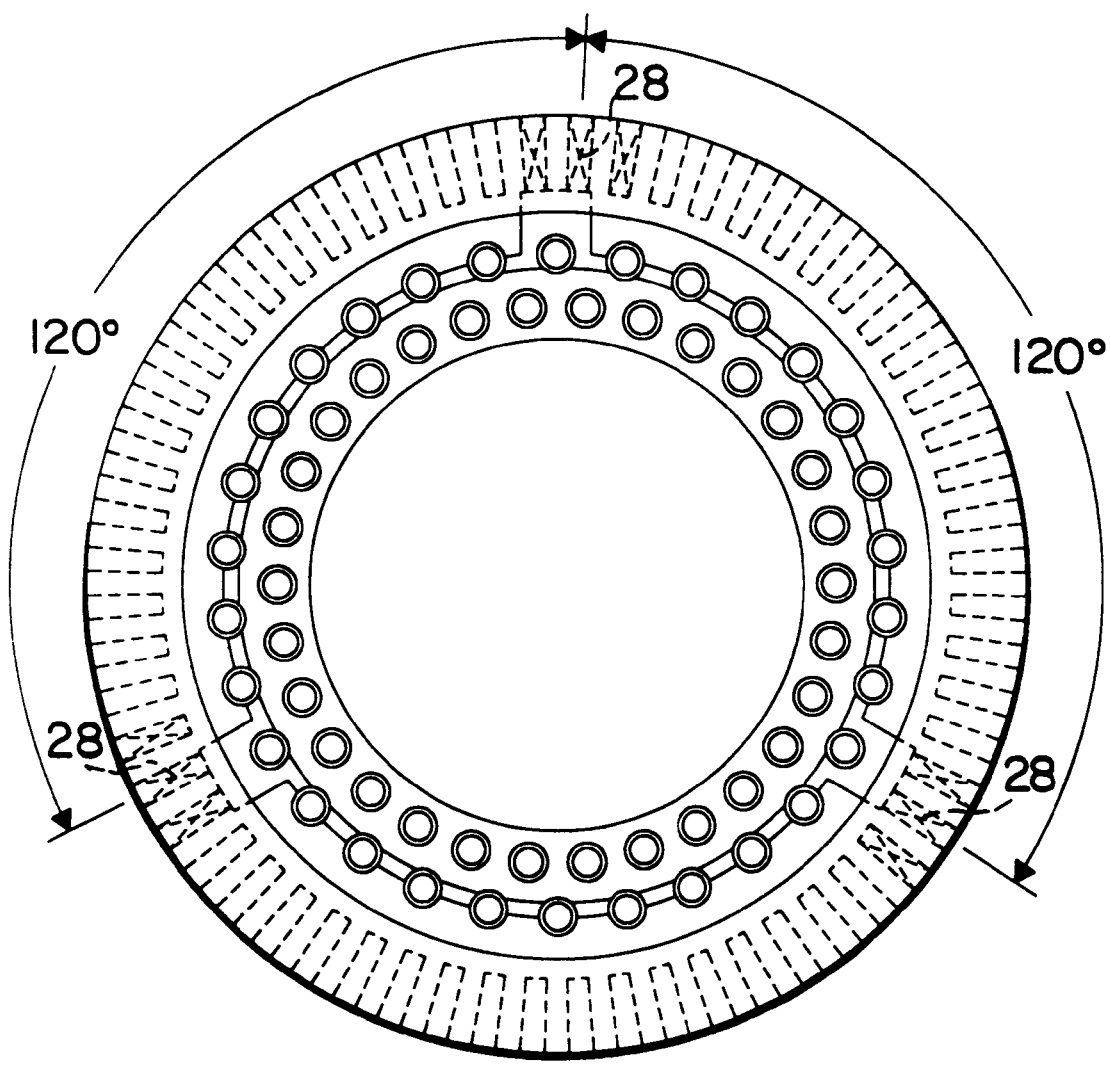
FIG. 7 is a cross-sectional view of a rotor core showing three groups of three consecutive rotor bars spaced 120 degrees apart.

To further increase the stability between the rotor cage and the rotor core, depressions are preferably formed in rotor bars spaced equally around the rotor core. The optimum balance between desired holding capability and unwanted stress has been achieved, as shown in FIG. 7, by creating depressions in rotor bars in groups of three 28 in a staggered fashion, with the groups spaced at about 120 degree intervals around the rotor core.

To form the depression in the rotor bar the press may be positioned against the rotor bar at any angle. However, to provide a depression substantially uniform in depth, the press is placed substantially perpendicularly against the rotor bar. A uniform depression will create more uniform deformation of adjacent rotor bar and core material.

The rotor assembly typically has an exterior powder coating which tends to crack during the formation of depressions. Subsequent to forming the depression, it is preferred to touch up areas of cracked coating with varnish such as Dolph™ AC43 air dry varnish. It is preferable to form depressions prior to application of a coating on previously uncoated rotor assemblies.

Following is one example of a preferred embodiment of a method to secure a rotor cage to a rotor core in a GEB 13 rotor assembly, manufactured by General Electric Company, with a shaft installed and the rotor assembly formed therefrom.

The GEB 13 assembly rotor cage, having 60 copper alloy rotor bars, is centered on the rotor core which is constructed of laminated steel disks. The rotor cage is squarely seated on a flat platen. Pressure is applied to the shaft end opposite the platen with force ranging from 4,536 to 13,608 kg. The inboard side of each end ring is inspected for scallop-shaped indentations. If indentations are present they should be less than 0.635 cm in depth.

The rotor assembly is positioned so that it can be rotated either horizontally or vertically. An arbitrary rotor bar is selected and marked with chalk. The next two consecutive rotor bars are then marked. Starting with the next unmarked bar, 17 bars are counted. The 18th. 19th and 20th bars are then marked with chalk. Another 17 bars are counted, after which the next three bars are marked. The resulting nine chalk-marked bars are the ones in which depressions will be formed. The three groups of three rotor bars will be substantially equally spaced around the core.

The rotor assembly is then positioned in a vertical or horizontal press, the press having a ram head to which a swage tool is attached. The press ram stroke is to be directly radial to the core and perpendicular to the shaft. Approximately 15.24 cm of clearance is allowed from the rotor diameter to the ram head to locate the swage tool.

A swage tool is used with a functional length of 2.54 cm and width of 0.305 cm. Guide keys on the press are fit firmly in the rotor slot openings. No hammering should be necessary. The tool has a locating arm attached to one side with a locating stop. The arm is adjusted to locate the depressions on either side of the axial center line of the rotor assembly. The arm is adjusted by loosening a set screw and sliding the locating arm so that when the locating stop is against the end ring, the depression is just to the right of the axial centerline. Similarly, when the tool locating arm is properly adjusted and the stop rests on the inboard side of the end ring, the depression is just to the left of the axial center line.

The swage tool is positioned to form a depression on the first chalk-marked rotor bar extending lengthwise from 31.42 cm from the outside of the end ring to 33.96 cm. The depression on the next consecutive rotor bar begins at a position of 33.96 cm and extends to 36.50 cm. The depression on the next consecutive rotor bar is positioned at the same location with respect to rotor bar length as the depression on the first rotor bar. The staggered locations of the depressions create an interlocking effect.

The ram head is pressed until the swage tool bottoms out on a tool base block of the ram head. The press tonnage must be regulated to release at approximately 11,793 kg. The correct depression depth is attained when the tool ram bottoms out on the base block, and the base block is tight against the rotor core.

The swage tool creates a depression 2.54 cm in length and 0.305 cm in width. The depth of the depression is measured with a depth gauge. The depth is measured from the longitudinally exposed surface of the bar toward the axial center of the rotor assembly. The depression depth should be 0.254 cm +/−0.025 cm, with a 0.305 cm maximum. The swage tool is repositioned in the circumferential and axial directions to form depressions in the remaining eight bars at staggered locations as described above.

A powder coating present on the rotor assembly prior to the process is often cracked during the process. This should be touched up with Dolph AC43 air-dry varnish following cleaning of the areas with a dry rag or shop air.

Advantageously, the use of the method described herein and the resulting rotor assembly, reduce movement of the rotor cage with respect to the rotor core and substantially fix the two rotor assembly components into a desired position, improving balance of the assembly and efficiency of the motor.

The above example describes an embodiment of performing the swage operation in a field service environment. In a factory environment, it is useful to have a dedicated press machine which facilitates rotation of the rotor beneath a fixed ram head and provides for high volume swaging of rotors.

While the invention has been described in what is presently considered to be several preferred embodiments, many variations and modifications will become apparent to those skilled in the art. Accordingly, it is intended that the invention not be limited to the specific illustrative embodiment but be interpreted within the full spirit and scope of the appended claims.

What is claimed is:

1. A method for reducing movement of a rotor cage relative to a rotor core in a rotor assembly, said rotor assembly including a) a hollow rotor core of substantially cylindrical shape having an outer surface, said rotor core having a plurality of substantially longitudinally extending slots formed in said outer surface; b) a rotor bar positioned within at least some of said slots, each rotor bar having an exposed longitudinal surface; and c) end rings secured to said rotor bars, comprising:

positioning the rotor cage on the rotor core;

applying a swage tool against a portion of the exposed longitudinal surface of said rotor bar; and forming at least one depression in at least one of said rotor bars to displace material, thereby deforming a portion of said rotor bar adjacent said depression, and causing a portion of said rotor core adjacent said depression to deform, said rotor bar deformation with said rotor core deformation substantially fixing said rotor bar into a desired position with respect to said rotor core.

2. The method as in claim 1 wherein forming the at least one depression comprises forming a plurality of depressions in a plurality of consecutive rotor bars and staggering the depressions longitudinally to create an interlocking effect.

3. The method as in claim 1 wherein forming the at least one depression comprises forming a plurality of depressions in a plurality of sets of consecutive rotor bars.

4. The method as in claim 3 wherein the sets of consecutive rotor bars are spaced at substantially equal angles from one another.

5. The method as in claim 1 further comprising centering the rotor cage on the rotor core, prior to applying the swage tool.

6. The method as in claim 1 further comprising applying the swage tool perpendicularly to the portion of the exposed longitudinal surface of the rotor bar.

7. The method as in claim 1 wherein the rotor core comprises steel.

8. The method as in claim 1 wherein the rotor bar comprises a copper alloy.

9. The method as in claim 1 wherein a depression depth of the at least one depression is in the range of about 5% to 15% of a rotor bar depth of the at least one of the rotor bars.

10. The method as in claim 1 wherein a depression depth of the at least one depression is in the range of 6% to 8% of a rotor bar depth of the at least one of the rotor bars.

11. The method as in claim 1 wherein a depression length of the at least one depression is in the range of 2% to 8% of a rotor bar length of the at least one of the rotor bars.

12. The method as in claim 1 wherein a depression length of the at least on depression is in the range of 3% to 5% of a rotor bar length of the at least one of the rotor bars.

13. The method as in claim 1 wherein a depression width of the at least one depression is in the range of 20% to 40% of a rotor bar width of the at least one of the rotor bars.

14. The method as in claim 1 wherein a depression width of the at least one depression is in the range of 30% to 35% of a rotor bar width of the at least one of the rotor bars.

15. The method as in claim 1 wherein a depression radius of curvature of the at least one depression is in the range of 0.127 cm to 0.191 cm.

16. The method as in claim 1 further comprising applying varnish to the rotor assembly subsequent to the process.

17. A method for reducing movement of a rotor cage relative to a rotor core in a rotor assembly, said rotor assembly including a) a hollow rotor core of substantially cylindrical shape having an outer surface, said rotor core having a plurality of substantially longitudinally extending slots formed in said outer surface; b) a rotor bar positioned within at least some of said slots, each rotor bar having an exposed longitudinal surface; and c) end rings secured to said rotor bars, comprising:

positioning the rotor cage on the rotor core;

applying a swage tool against a portion of the exposed longitudinal surface of said rotor bar; and forming a depression in each of a plurality of consecutive rotor bars, to displace material, thereby deforming a portion of said rotor bars adjacent said depressions, and causing a portion of said rotor core adjacent said depressions to deform, said rotor bar deformation with said rotor core deformation substantially fixing said rotor bars into a desired position with respect to said rotor core, including longitudinally staggering said depressions in said consecutive rotor bars, thereby creating an interlocking effect, and spacing groups of said consecutive rotor bars equally around said rotor core.

* * * * *